US005772775A

United States Patent [19]

Riviere

[11] Patent Number: 5,772,775

[45] Date of Patent: Jun. 30, 1998

[54] METHOD OF EXTRACTION OF JUICE FROM SUGAR CANE

[76] Inventor: Michele Marcelle Amelie Riviere, Appartement 42, Residence "Compagnie des Indes" 20 Rue de la Compagnie, 97400 Saint Denis, Reunion Island, France

[21] Appl. No.: 547,630

[22] Filed: Oct. 24, 1995

[51] Int. Cl.$^6$ ................................ B01J 3/00; C13D 1/12; C13D 1/00

[52] U.S. Cl. .................................... 127/45; 127/2; 127/5; 127/6; 127/43

[58] Field of Search ................................. 127/2, 5, 6, 43, 127/45

[56] References Cited

U.S. PATENT DOCUMENTS

| | | | |
|---|---|---|---|
| 1,645,242 | 10/1927 | Istelli | 127/43 |
| 3,275,472 | 9/1966 | Tantawi et al. | 127/45 |
| 3,695,931 | 10/1972 | Hamill | 127/45 |
| 4,043,832 | 8/1977 | Leibig et al. | 127/43 |
| 4,378,253 | 3/1983 | Bouvet | 127/6 |
| 4,664,716 | 5/1987 | Leibig | 127/6 |
| 5,073,200 | 12/1991 | Leibig | 127/6 |
| 5,227,075 | 7/1993 | Ostman | 210/781 |
| 5,358,571 | 10/1994 | Villavicencio et al. | 127/53 |

FOREIGN PATENT DOCUMENTS

| | | | |
|---|---|---|---|
| 0 707 078 | 4/1996 | European Pat. Off. | C13D 1/02 |
| 2.050.660 | 4/1971 | France | C13D 1/00 |
| 2 310 409 | 12/1976 | France | C13D 1/04 |
| 2 477 177 | 9/1981 | France | C13D 1/04 |
| 2 507 621 | 12/1982 | France | C13D 1/00 |
| 1095787 | 12/1967 | United Kingdom | C13D 1/02 |
| 1143640 | 2/1969 | United Kingdom | C13D 1/12 |

OTHER PUBLICATIONS

G.P. Meade et al., "Extraction of Juice", Cane Sugar Handbook, Tenth Edition, pp. 81–91. Apr. 1978.

*Primary Examiner*—Walter D. Griffin
*Assistant Examiner*—Patricia L. Hailey
*Attorney, Agent, or Firm*—Young & Thompson

[57] ABSTRACT

A continuous countercurrent process is provided of extracting juice from a bed of fibrous material such as sugar cane, the process comprising a plurality of stages, preferably three, with each stage including the removal of air, displacement of juice by a true plug-flow process, and drainage of the displaced juice and displacing medium.

5 Claims, 2 Drawing Sheets

METHOD OF EXTRACTION OF JUICE FROM SUGAR CANE

FIELD OF THE INVENTION

This invention relates to a method of extraction of juice from sugar cane for use in the manufacture of sugar.

BACKGROUND OF THE INVENTION

In cane, the sugar-rich juice that is required to be extracted, is stored in easily ruptured storage cells. Cane preparation methods such as shredding are capable of opening up to 94% of these juice-containing cells, resulting in a mixture of sugar-rich juice and fibre containing a large percentage of the low purity material which is not easily damaged in the breakdown of the storage cells.

Traditional juice extraction methods such as dry pressure extraction, leaching and diffusion have been unable to take advantage of the structure of the prepared cane, and despite technical advancement, are still characterised by low efficiency.

Theoretically, the isolation of the juice from the fibre may be achieved by physically displacing the juice with water. This was recognised as early as 1889 by Matthey who obtained UK Patent No. 21021 for his simple process.

According to literature, the displacement is best effected by means of a counter-current flow of water and fibre-juice in which the water advances as a front (plug-flow) which operates similar to pistons by pushing through the ruptured cells and replacing the juice.

To achieve an efficient plug-flow displacement system, there must be no disruptions in the bed of fibre and juice as this would lead to water by-passing the material. Further, mixing in the system reduces the counter-current flow and consequently expulsion of juice by pressing or squeezing is undesirable.

Consequently the ideal system constitutes an undisturbed bed of fibre and juice and a plug-type water and juice flow.

This ideal situation is difficult to achieve on a commercial scale but can be approximated by maintaining the undisturbed bed in a horizontal position and breaking down the plug flow liquid displacement into stages.

The Silver Ring diffuser operates according to this principle but involves an 18 stage process where water is added from above a continuous bed, flows through the moving bed and drops into a juice compartment below. The reason for the length of the process is that mixing takes place preventing ideal plug-flow displacement.

Another factor believed to hinder efficiency is the presence of a large volume of air in the bed. Air removal in batch diffusion in the beet sugar industry was considered essential. A process known as meichage was used commercially in 1930 in the Naudet process of bagasse batch diffusion. This involved removal of air by the addition of water from below, the advancing front of water carrying the air to the top of the bed from where it was released. This has, however, only been possible in a batch process.

The construction of an efficient plant must be based upon a consideration of the structure and volumetric composition of the raw material which in prepared cane is characterised by a low bulk density and a high void volume (i.e. it is filled with air).

In order to achieve an efficient extraction process, compaction of the bed must be avoided to prevent low percolation rates as well as expulsion of juice. Further voids in the bed of cane must be filled to facilitate a free flowing mixture of cane and juice.

It is therefore an object of this invention to provide a method and apparatus for the continuous extraction of juice from sugar cane which takes advantage of the structure of prepared cane resulting in drastically improved extraction efficiency.

THE INVENTION

According to the invention, a process for the extraction of juice from a bed of fibrous material comprises a continuous countercurrent process in a plurality of stages, each stage including the steps of removal of air, displacement of the juice by means of a true plug-flow process, and drainage of the displaced juice and displacing medium.

In the preferred form of the invention, the fibrous material prepared is sugar cane and the process comprises three stages, the displacing medium for stage one and stage two being the juice drained from stage two and stage three respectively, while water constitutes the displacing medium for stage three.

Removal of air is achieved by meichage as described above.

The three stage displacement process of the invention is preferably carried out on a conventional horizontal drag type conveyor, the speed of the conveyor being set according to the cane flow so that a bed of depth in the range 0.3 to 0.5 meters is maintained. This facilitates maintenance of a high percolation rate which, with the assistance of increased hydrostatic head, is typically 0.1 meters per second. This is a significant improvement on the 0.1 meters per minute typically obtained in the prior art process.

In order for efficient extraction to take place, the juice content of the megasse must be of the order of twenty times the fibre content of the cane (i.e. the fibre content of the megasse must be less than 5%). Under these conditions, the megasse (cane fibre and juice) behaves like a liquid. This ensures that no mechanical handling of the megasse is required during meichage and displacement.

EMBODIMENTS OF THE INVENTION

Embodiments of the invention are described below with reference to the accompanying drawings in which:

BRIEF DESCRIPTION OF THE FIGURES

In FIG. 1, shredder 10 delivers shredded cane onto the conveyor. The conveyor moves at a speed set according to the cane flow so that a layer of depth of approximately 0.3 m is moved along over the perforated bottom 11 of the conveyor.

Figure 1:
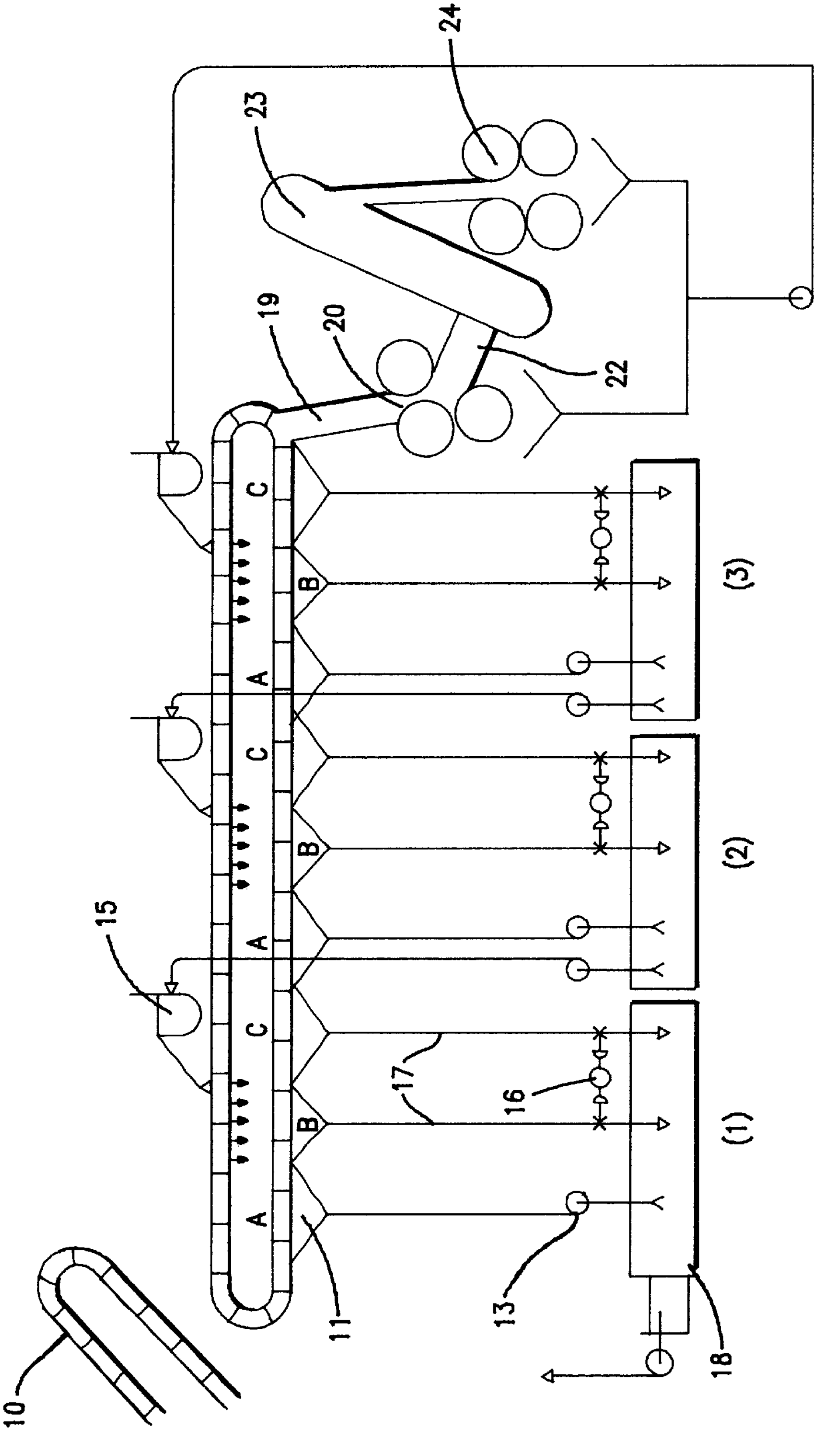
FIG. 1 is a side view of a drag type conveyor operating according to the process of the invention.

Meichage juice is pumped from tank 18 by variable speed pump 13 at controlled rate and pressure. The rates maintained are sufficient to ensure that the level of the juice just covers the surface of the layer of the cane leaving the meichage part (A) of the conveyor.

In the displacement section (B), displacement juice is fed from overhead trough 15 in a rain tray pattern. This prevents mixing and improves the efficiency of the displacement and is achieved by delivery of the juice onto the upper deck of the conveyor.

The level of the juice is maintained by means of automatic valves 16 in drainage pipes 17. The juice from the displacement (B) and drainage (C) sections drains down pipe 17 into tank 18.

It should be noted that in order to ensure sufficient hydrostatic head for the plug flow displacement process and for quick drainage of the megasse leaving each stage, the level of juice in the receiving tank 18 in each stage must be at least 2 meters, and preferably between 3 to 4 meters lower than the level of juice in the conveyor (top of the cane bed).

This process is repeated in stages two and three, the only variations being in the sugar content of the displacement and meichage juices. Displacement juice for stage two is the drainage (displaced) juice from stage three, while in stage three the displacement juice is actually water from the dewatering mill.

The megasse (cane fibre and juice) is discharged from the conveyor via chute 19 into the pre-extractor 20 which is a tilted three roller mill designed to remove half the juice content of the megasse.

The bagasse emerging from the pre-extractor is conveyed via a closed chute 22 (Meinecke chute) to the base of the conventional bagasse elevator 23 feeding the (Donelly) chute of the final dewatering mill 24. This mill is a conventional four roller mill.

Figure 2:
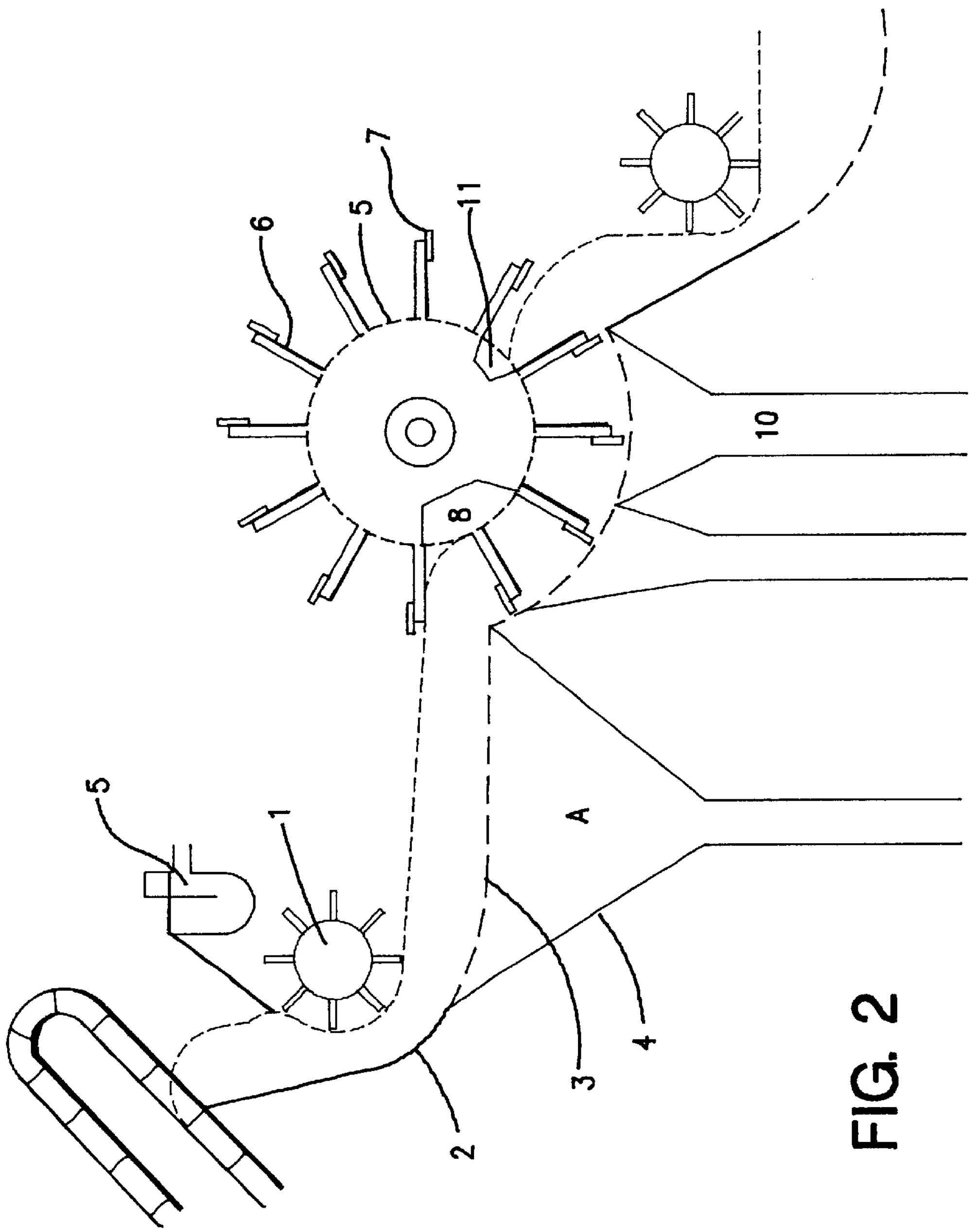
FIG. 2 is a similar view of an alternative type of equipment.

Turning now to FIG. 2, a cross-flow displacement system is illustrated, which is useful for plants with high load capacities.

In this system, a portion of meichage juice is added from overhead tank 5 and incorporated into the solid feed (shredded cane) while it is being thinned out by macerator 1. The resultant slurry is thrown down curved plate 2 into open trough 4.

At this point, a second portion of meichage juice is added, this time from below via the perforated bottom 3 of the open trough 4. The slurry then flows under the influence of gravity to the displacement section B.

The displacement section comprises a curved perforated bottom through which the displaced juice flows. To prevent clogging, the bottom is scraped by perforated drum 5 which also assists in moving the megasse along once it becomes more solid in the drainage section. To this end, the drum is fitted with spikes 6 which are welded to the drum in twelve generating lines. The scraping action is facilitated by scraper plates 7 welded to the tips of each row of spikes Displacement juice is admitted inside the perforated drum, above the displacement section.

For that purpose the perforated drum is open at each end. A thick steel disk is welded inside the perforated drum, half way between the ends. This disc is welded to a hub, wedged to the shaft. The drum is driven by a hydraulic or electric variable speed motor, at a speed of 1 to 2 RPM.

Figure 3:
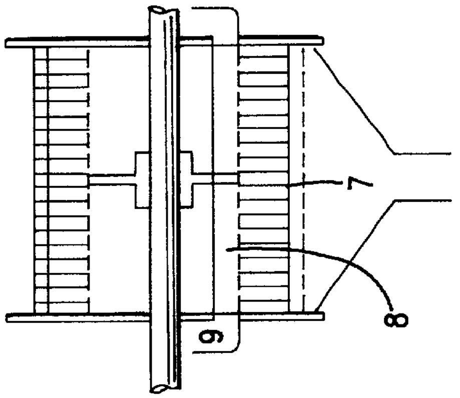
FIG. 3 is an end view of the perforated drum (5) of FIG. 2.

Displacement juice can be admitted inside the perforated drum (in a distribution box 8 from each end) (FIG. 3), through the flanges from an outside box in which the level of juice can be controlled so that no air is admitted. In this way, displacement juice, uniformly distributed over the megasse in the displacement section, can flow across and collect into the double bottom, from which it drains to the receiving tank below. The flow of displaced juice is controlled by an automatic valve on the discharge pipe monitored by the level in juice box 9.

In the drainage section C, air is admitted on top of the bed megasse allowing the remaining juice to be drawn down by the hydrostatic head between the top of the bed of cane and the level of juice in the receiving tank below, via pipe 10.

The drained megasse is then discharged by the action of gravity, assisted by the spikes of the perforated drum, down a 60° slope. To supplement the flow properties of the megasse, into the next stage of the extraction, meichage juice from that stage is admitted into distribution box 11 in the drum, through the flanges located either side thereof.

The megasse then undergoes the same process twice more in the same sequence.

The importance of the hydrostatic head should be emphasised.

In commercial diffusers the juice is discharged from the perforated bottom in open tanks, so that the hydrostatic head can not be more than the thickness of the bed of cane (1 to 2 meters). In fact it is much less due to the presence of air in the bed.

In the present process the juice is collected in a closed bottom. Providing that the pipe discharging the juice into the receiving tank below, is kept full (by control valve), the hydrostatic head can be increased to 2 to 4 meters (or more) as it is equal to the difference of level between the juice in the bed of cane and the juice in the receiving tank.

The discharge pipe acts as a barometric leg, pulling down the juice with the same driving force as if the level of juice over the surface of the can bed were 2 to 4 meters high.

I claim:

1. A process for extracting juice from fibrous material, comprising the steps of:

a) admixing said fibrous material with water, to form an aqueous slurry, b) introducing additional water into said aqueous slurry from below said aqueous slurry, to displace and remove air trapped in said aqueous slurry, c) displacing juice from said aqueous slurry by a flow of water in which the water advances as a plug-flow, d) draining displaced juice from said aqueous slurry, and e) repeating steps b)–d) at least once, wherein said aqueous slurry has a liquid content approximately 20 times its content of said fibrous material.

2. The process according to claim 1, wherein steps b)–d) are performed first in a first stage of a conveying apparatus, and are repeated twice in second and third stages of a said apparatus, and wherein step c) is performed in said first stage and said second stage using juice drained from the second and third stages, respectively.

3. The process according to claim 2, wherein said conveying apparatus is a horizontal drag type conveyor.

4. The process according to claim 1, in which step b) is carried out by meicharge.

5. The process according to claim 1, wherein said aqueous slurry has a depth in the range of 0.3 to 0.5 meters.

* * * * *